United States Patent [19]

Edwards et al.

[11] Patent Number: 4,664,992
[45] Date of Patent: May 12, 1987

[54] COMPOSITE BATTERY SEPARATOR

[75] Inventors: Dean B. Edwards, Pasadena; Wally E. Rippel, Altadena, both of Calif.

[73] Assignee: California Institute of Technology, Pasadena, Calif.

[21] Appl. No.: 654,136

[22] Filed: Sep. 26, 1984

[51] Int. Cl.$^4$ ............................................ H07M 2/16
[52] U.S. Cl. ................................. 429/144; 429/145; 429/246; 429/247
[58] Field of Search ................. 429/246, 247, 143–147

[56] References Cited

U.S. PATENT DOCUMENTS

| 3,997,366 | 12/1976 | Davis, Jr. ........................... | 429/144 |
| 4,055,711 | 10/1977 | Ikari ................................... | 429/143 |
| 4,091,183 | 5/1978 | Niggl ................................ | 429/143 X |
| 4,217,401 | 8/1980 | Pellegri et al. ................. | 429/143 X |
| 4,245,013 | 1/1981 | Clegg et al. ..................... | 429/144 |
| 4,378,414 | 3/1983 | Furukawa et al. ................ | 429/144 |
| 4,400,447 | 8/1983 | Gerenser et al. ............... | 429/143 X |
| 4,448,862 | 5/1984 | Schulte et al. ................. | 429/144 X |

Primary Examiner—Brian E. Hearn
Assistant Examiner—Stephen J. Kalafut
Attorney, Agent, or Firm—Marvin E. Jacobs

[57] ABSTRACT

A composite battery separator comprises a support element (10) having an open pore structure such as a ribbed lattice and at least one liquid permeable sheet (20,22) to distribute the compressive force evenly onto the surfaces of the layers (24, 26) of negative active material and positive active material. In a non-flooded battery cell the compressible, porous material (18), such as a glass mat which absorbs the electrolyte, is compressed into a major portion of the pores or openings (16) in the support element. The unfilled pores in the material (18) form a gas diffusion path as the channels (41) formed between adjacent ribs in the lattice element (30,36). Facing two lattice elements (30, 31) with acute angled cross-ribs (34, 38) facing each other prevents the elements from interlocking and distorting a porous, separator (42) disposed between the lattice elements.

14 Claims, 6 Drawing Figures

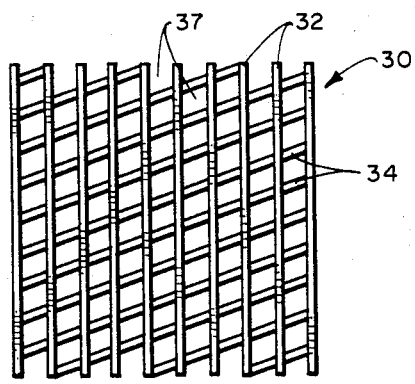
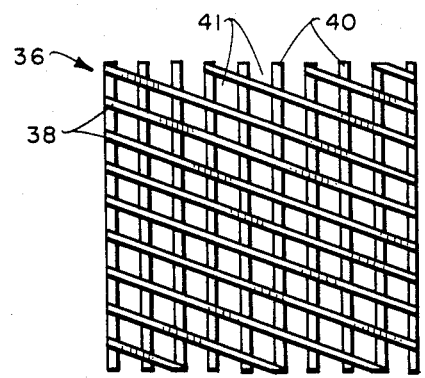
Fig. 2.  Fig. 3.
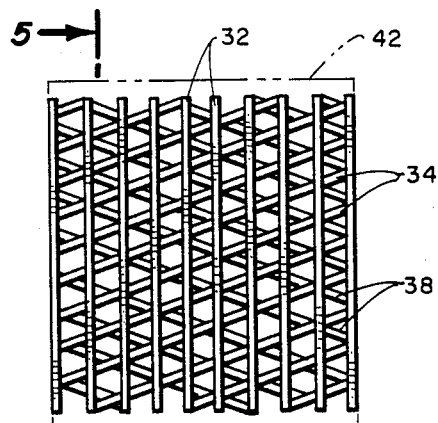
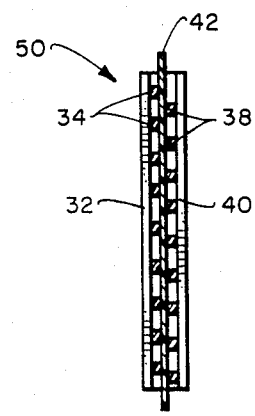
Fig. 4.  Fig. 5.

COMPOSITE BATTERY SEPARATOR

DESCRIPTION

Origin of the Invention

The invention described herein was made in the performance of work under a NASA contract and is subject to the provisions of Section 305 of the National Aeronautics and Space Act of 1958, Public Law 83-568 (72 Stat 435; 42 USC 2457).

TECHNICAL FIELD

The present invention relates to primary and secondary electrochemical cells and batteries, and more particularly to cells and batteries having composite separator systems.

BACKGROUND ART

With virtually all electrochemical cells, separator members must be interposed between adjacent electrodes of opposite polarities to prevent electronic conduction (shorting) which could result from either direct or dendritic contact. Additionally, the separator members must enable the free flow of ion (ionic conductivity), the flow of solvent molecules (mass transport), and the flow of gas molecules (gas transport). In addition to these functions, the separators may be required to provide surface support for the adjacent electrodes (containment) and storage of electrolyte within its pores. Unfortunately, the simultaneous requirements for containment and electrolyte storage tend to be mutually exclusive, since effective containment requires axial pressure which, in turn, leads to separator compression and loss of porosity.

With flooded systems (separators electrolyte saturated), gases produced at electrode surfaces must be transported to the periphery of the electrodes and expelled. In general, this requires that gas transport channels be included in the separator. The inclusion of such channels generally compromises the containment potential of the separator which, in turn, leads to reduced life.

With starved designs (separators not saturated with electrolyte), gases produced at one electrode are generally consumed at the opposing electrode and, therefore, only axial gas transport is required. However, with most starved systems, a defined, controlled amount of electrolyte storage is required. Since conventional separators are incapable of simultaneously achieving high porosity and low compliance, the simultaneous requirements for good containment (axial pressure), electrolyte storage and high porosity are not achievable. Because of this dilemma, the usual solution is to compromise the containment function of the separator. This, in turn, leads to reduced life and non-economical design. Tubular and spiral battery configurations have also utilized separators for containment of electrolyte. They suffer from high cost and low performance.

In order to remedy the above problems, a separator system is desired having the following simultaneous properties and capabilities:

1. Effective dendrite barrier.
2. Good ionic conductivity.
3. Good mass transport characteristics.
4. Accurately defined thickness.
5. High stiffness constant (low compliance).
6. Uniform surfaces having small pore sizes.
7. Lateral gas transport capability for flooded designs.
8. Axial gas transport for starved designs.

STATEMENT OF THE INVENTION

The following invention achieves each of the above criteria using a novel, low-cost composite structure. The battery separator provided in accordance with the present invention is a composite structure consisting of three elements—a support structure, surface overlay sheets and a porous filler structure.

The support structure can be in the form of a ribbed lattice which is highly open in the direction normal to the surface and may or may not provide open internal channels parallel to the surface. In general, open internal channels are either necessary or desired where lateral gas transport is encountered, as with flooded designs. The support element functions to transmit axial compression forces while maintaining constant volume of the open spaces. A non-channel-type of support structure, e.g., a honeycomb, can be used in a sealed battery where lateral gas transport is not needed. Containment is, in fact, superior to the channel-type of support element, since all surfaces are subjected to equal compression forces. Surface overlay sheets are, in general, secured to each face of the support structure. The overlay sheets are of either a closely woven or a microporous material. The overlay sheets should resist stretching and be inert in the electrochemical environment. The function of the overlay sheets is to provide active material containment by transmitting axial forces from the support structure to adjoining active material surfaces.

A porous filler material is housed within the open volumes of the support structure and bounded by the overlay sheets. The function of the filler material is to contain the electrolyte by capillary means, to impede dendrite penetration and to enhance axial gas transport in starved electrolyte systems.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 2 is a front view in elevation of a first separator support element used in the cell assembly of the invention;

FIG. 3 is a front view in elevation of a second separator support element used in the cell assembly of the invention;

FIG. 4 is a front view in elevation of a cell assembly for a flooded cell;

FIG. 5 is a view in section taken along line 5—5 of FIG. 4; and

DETAILED DESCRIPTION OF THE DRAWINGS

Figure 1:
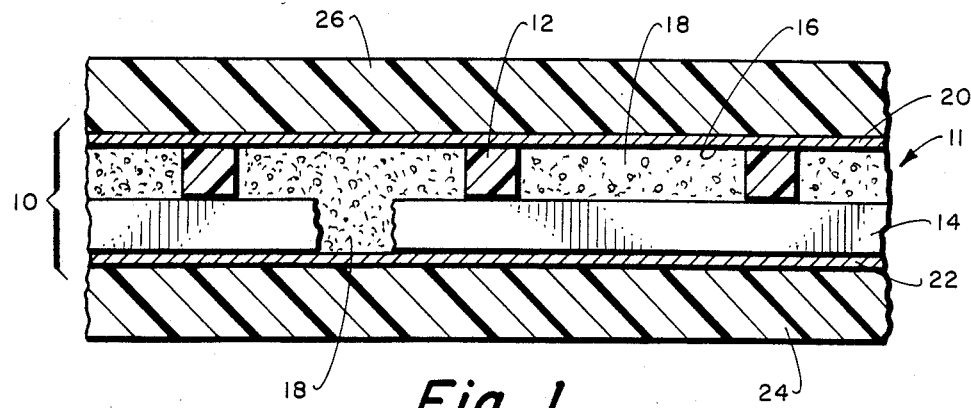
FIG. 1 is a view in section of a composite separator of the invention for a sealed cell shown assembled between layers of electrode materials.

Referring now to FIG. 1, the composite separator 10 comprises an open support structure such as a ribbed lattice 11 having ribs 12 on one surface attached to cross ribs 14 on the other surface forming a lattice with openings 16. The ribs may have a rectangular, polygonal or cylindrical cross-section. In a sealed design, the openings 16 are filled with a porous, capillary, filler material 18 which imbibes the liquid electrolyte. The outer surfaces of the ribs can be covered with overlay sheets 20, 22 to provide a more even application of compressive force to the layers 24, 26 of negative active material and positive active material. The overlay sheet is not necessary on the negative active material in a flooded design.

The surface of the positive active layer 26 is oxidative. This environment could oxidize materials such as polyethylene precluding direct contact of support elements with the positive electrode unless they are formed of oxidation resistant materials such as polyphenylene oxide or polyphenylene sulfide. It is, therefore, preferred to isolate the support element by use of an overlay of gas-permeable, oxidation-resistant material such as a sheet woven glass mat. As axial pressure is applied to the composite separator, the strip of glass mat between adjacent ribs will stretch and bridge the ribs providing support to the opposed layer of active material. This will prevent shedding of active material and improve the electrical contact between the layer of active material and underlying conductor. The woven glass mats can be formed of the same material utilized to support positive active material in tubular lead-acid battery designs. The glass is preferably a C-glass type which is resistant to oxidation. Use of these glass mats permits use of oxidizable plastics such as polyethylene or polypropylene for the support element.

The porous filler material 18 can be a compressible porous mat having good wetability for the electrolyte so that the sheet is capable of retaining liquid electrolyte. In a sealed design, the mat must permit diffusion of oxygen gas to the negative electrode. The porous material retains virtually all electrolyte except for an amount which seeps into the plate. The porous material can be an open cell, rigid foam material such as a microporous polyolefin, suitably high density polyethylene or polypropylene. Preferred mats are formed of high surface area, high porosity glass mats. Suitable mats are formed from micron-sized glass having a porosity of 80 to 95 percent. The volume of electrolyte contained in the sheet is less than 90 percent of the pore volume, usually from 20 to 80 percent thereof.

In a sealed design, the support element, which can be a ribbed lattice or honeycomb, transmits the axial pressure while permitting the porous filler material to maintain its design volume without compression. This prevents loss of electrolyte due to compression of the filler material and also maintains a network of open pores which allows oxygen evolved at the positive electrode to diffuse to the negative electrode for recombination. However, in a flooded design battery, a pathway must be provided to allow gases evolved at the electrodes to escape. The porous material is not utilized in a flooded design for retaining electrolyte and applying force to the electrode layers. A porous sheet of separator is utilized to prevent dendritic growth. The open structure support element is utilized to transmit axial pressure to the electrode layers.

The support element in FIG. 1 is shown with perpendicular cross-ribs since the support element in a sealed design is only concerned with preventing compression of the porous, electrolyte imbibing material. A set of perpendicular lattice elements when faced together provide good contact for transmitting axial pressure when faced on either side of a conventional electrolytepermeable separator sheet. However, the elements will slip, interlock and deform the separator sheet into a convoluted shape. Therefore, when the lattice elements are utilized facing each other, it is preferred to utilize lattice members with cross-ribs disposed at an acute angle to the front ribs as illustrated in FIGS. 2-5. This configuration prevents interlocking of the elements.

Referring now to FIG. 2, one of the lattice elements 30 contains parallel ribs 32 on one surface attached to parallel cross-ribs 34 on the opposite surface. The cross-ribs 34 are disposed at an acute angle to ribs 32 forming vertical gas channels 37. In the lattice element 36 shown in FIG. 3, the cross-ribs 38 form the same acute angle to the front ribs 40 as in the first lattice element 30 forming gas channels 41 which run sideways and at an angle. The elements 30, 36 are faced together on opposite sides of a separator sheet 42, as shown in FIGS. 4 and 5, with the cross-ribs 32, 34 running in opposite directions to form an assembly 50.

In assembly 50 the elements 30, 36 are both disposed with the face with the vertical ribs 32, 40 disposed to the outside. The angled cross-ribs 34, 38 face each other across a separator sheet 42 and run in opposite directions. The cross-ribs are thus offset and intersect at numerous points providing good support for the separator sheet while transmitting axial pressure to the electrodes. The cross-rib structure prevents the elements from interlocking and distorting the porous separator sheet. A suitable material for the separator is microporous polyethylene.

Figure 6:
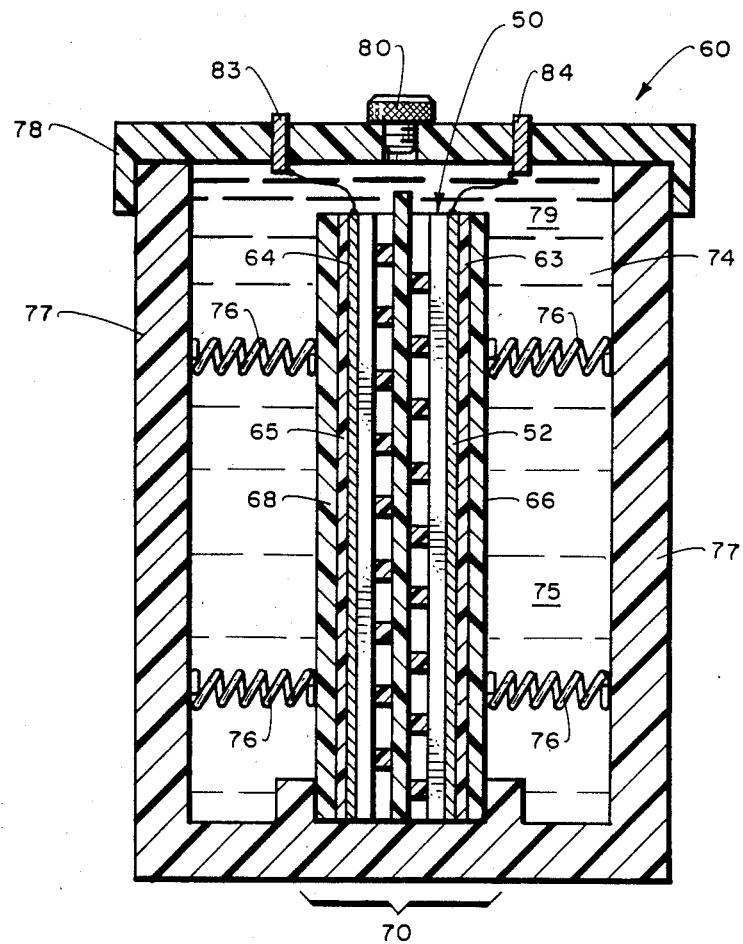
FIG. 6 is a view in section of a flooded cell.

Referring now to FIG. 6, the assembly 50 is formed into a cell 60 by placing the assembly 50 between the active layer 52 of a negative electrode 63 and the active layer 64 of a positive electrode 65 to form a stack 70. The active layers 52, 64 are coated onto conductive support grids on backings 66, 68. The stack 70 is disposed within a cell compartment 74 containing a body 75 of electrolyte. Means are provided for applying axial pressure to the stack 70 such as compliant members 76 disposed between the compartment wall 77 and the backing members 66, 68. The vertical channels 37 form a path for gas developed at either electrode to move upwardly into the electrolyte 75 and headspace 79. The cell cover 78 contains a vent cap 80 and terminals 83, 84 connected to the electrodes 63, 65.

Although vertical orientation of the electrodes has been illustrated, a horizontal plate configuration eliminates electrolyte stratification and the biased stack of plates with compliant separator sheets, prevents sloughing off of active material eliminating the need for a sedimentation well. Axial pressure also improves contact and energy density. The horizontal stack of plates is easier to compress than a vertical stack and the horizontal disposition also facilitates use of multiple connections to each plate without spatial interference as occurs with vertical stacking. The horizontal orientation is only possible with the sealed design.

The plates can contain a central grid perferably formed of thin, perforated metal. The metal is suitable 10 to 100 mils, preferably 40 to 60 mils, in thickness and may be cast, perforated mechanically such as by the expanded metal technique as disclosed in U.S. Pat. Nos. 3,310,438 or 3,881,952, the disclosures of which are expressly incorporated herein by reference. The sheet may contain a header along one edge from which the multiple tigs project. The use of multiple tigs along an edge permits increasing the length of the plates. The L/W ratio can now exceed 1 and can be from 1.5/1 to 3/1 or higher. The metal substrate forms a grid for receiving a layer of paste to form a Faure-type plate. The grid is preferably formed of a non-antimonial lead alloy such as lead-calcium or lead-calcium-tin alloy to eliminate formation of hydrogen gas.

Pasted plate lead-acid batteries are by far the most common type of lead-acid battery. The paste may comprise lead for the negative plate and lead oxide or lead sulfate for the positive plate. Water-swellable bulking agents such as 0.05 to 0.5 percent by weight of lingosulfonates and 1 to 3 percent by weight of expander materials, such as barrium sulfate or carbon black, may be present. Typically, a paste of lead oxide is applied to the terminals and the lead oxide paste on the positive grid is oxidized to lead dioxide while the lead oxide on the negative plate is reduced to sponge lead. During operation of the lead-acid battery, the lead dioxide will be sulfated to lead sulfate and the paste will expand.

A battery is assembled by applying electrode paste to both surfaces of the grid substrates and curing the paste. The electrodes are interleaved with composite separators. The electrolyte is then imbibed into the porous material in the channels of the composite separator in the case of a sealed design. The stacks are inserted into the cell compartments and the lids applied. A pressure relief valve is then installed in the sealed battery. The electrodes can then be actuated by applying an initial charge to the terminals.

Since gas evolved at the positive electrode in a sealed cell need not escape the cell, design of an assembly with a support element is much simpler. For a cell for a sealed battery comprises, in sequence, a positive plate, a microporous glass mat compressed into the open channels of a support element such as a honeycomb structure and a negative plate. The assembly is housed in a cell compartment which may contain an unidirectional, over-pressurization vent valve. The assembly can contain means for applying axial pressure to the electrodes. The liquid electrolyte is contained within the pores of the mat. The electrolyte volume is less than the pore volume such that sufficient pores are open to form a path for diffusing oxygen gas evolved at the positive electrode to the negative electrode where it is recombined. The positive electrode to the negative electrode where it is recombined. The positive electrode is limiting such that oxygen is evolved first at this electrode on discharge.

Since the cell is closed and sealed, the formation of directional gas channels is not as critical as in a flooded design. Even if the oxygen diffuses out of the edges of the glass mats, the oxygen gas restricted to the sealed battery chamber will eventually reach the negative plate. The electrolyte may also be wrapped with, or faced with, a woven cloth to better distribute the axial pressure across the face thereof as discussed above. Thus, the support element need not be ribbed but could be formed of any stiff material that has an open cell structure such as a honeycomb. It is preferred that the support element have a high open volume. The ratio of open volume to solid across the face of the element is preferably at least 1/1, usually at least 2/1. The necessary criteria is the ability to transmit axial pressure across the electrolyte member without excessively compressing it.

The incompressible separator support member can also be utilized in tubular or spiral battery cell configurations. The stack of plates can be monopolar or bipolar or combinations thereof. Lightweight plates can be formed of composite central plates such as resin reinforced with a dispersion of conductive metal or graphite fibers and/or powders.

It is to be realized that only preferred embodiments of the invention have been described and that numerous substitutions, modifications and alterations are permissible without departing from the spirit and scope of the invention as defined in the following claims.

We claim:

1. In a liquid-containing electrochemical cell wherein positive and negative electrode plates separated by an insulating separator are urged towards one another under pressure, the improved separator comprising:
    (a) a highly porous, non-compressible sheet of an insulating material wherein said sheet is formed of;
    (b) a plurality of parallel, spaced, first straight linear elements defining a first surface on one side of said sheet; and,
    (c) a plurality of parallel, spaced, second straight linear elements defining a second surface on the opposite side of said sheet, said second straight linear elements being non-parallelly disposed with respect to said first linear straight elements, the spaces between said first straight linear elements communicating with the spaces between said second straight linear elements to form a plurality of conduits between said first and second surfaces.

2. The improved separator for an electrochemical cell of claim 1 wherein:
    (a) said first and second straight linear elements are continuous and disposed to extend between adjoining edges of said sheet; and,
    (b) said first and second straight linear elements are joined to each other at their points of intersection, whereby said non-compressible sheet is in the form of a ribbed lattice.

3. The improved separator for an electrochemical cell of claim 1 wherein:
    said first and second straight linear elements are discontinuous and said non-compressible sheet is in the form of a honeycomb.

4. The improved separator for an electrochemical cell of claim 1 wherein:
    (a) said first straight linear elements form a plurality of first parallel channels on said first surface extending between adjacent edges of the separator; and,
    (b) said second straight linear elments form a plurality of second parallel channels on said second surface extending between adjacent edges of the separator, one of said adjacent edges between which said first channels extend being a side opposite one of said adjacent edges between which said second channels extend.

5. The improved separator for an electrochemical cell of claim 1 and additionally comprising:
    (a) a first sheet of porous insulative material disposed over said first surface; and,
    (b) a second sheet of porous insulative material disposed over said second surface, said first and second sheets of insulative material being adapted to form over said first and second straight linear elements, respectively, so as to transfer the compressive forces being applied against the separator by the electrodes over broader lines of contact.

6. The improved separator for an electrochemical cell of claim 5 wherein:

said first and second sheets of porous insulative material include portions which are adapted to deform into said plurality of conduits between said first and second surfaces and contact one another therein to additionally form a capillary path between said first and second surfaces for the containment of liquid electrolyte therein.

7. The improved separator for an electrochemical cell of claim 5 wherein:

said first and second sheets of insulative material each comprise an outer microporous overlay sheet portion for contacting the adjacent electrode of the cell and an inner capillary-defining porous material adapted to deform into said plurality of conduits between said first and second surfaces to form a capillary path between said first and second surfaces for the containment of liquid electolyte therein.

8. An improved separator for use in a liquid-containing electrochemical cell wherein positive and negative electrode plates separated by the separator are urged towards one another under pressure, said improved separator comprising:
   (a) a highly porous, non-compressible sheet of an insulating material formed of a plurality of parallel, spaced first straight linear elements defining a first surface on one side of said sheet and a plurality of parallel, spaced second linear elements defining a second surface on the opposite side of said sheet, said second straight linear elments being non-parallelly disposed with respect to said first straight linear elements, the spaces between said first straight linear elements communicating with the spaces between said second straight linear elements to form a plurality of conduits between said first and second surfaces;
   (b) a first sheet of porous insulative material disposed said first surface; and,
   (c) a second sheet of porous insulative material disposed over said second surface, said first and second sheets of insulative material being adapted to form over said first and second straight linear elements, respectively, so as to transfer the compressive forces being applied against the separator by the electrodes over broader lines of contact.

9. The separator of claim 8 wherein:
   (a) said first and second straight linear elements are continuous and disposed to extend between adjoining edges of said sheet; and,
   (b) said first and second straight linear elements are joined to each other at their points of intersection, whereby said non-compressible sheet is in the form of a ribbed lattice.

10. The separator of claim 8 wherein: said first and second straight linear elments are discontinuous and said non-compressible sheet is in the form of a honeycomb.

11. The separator of claim 8 wherein:
   (a) said first straight linear elements form a plurality of first parallel channels on said first surface extending between adjacent edges of the separator; and,
   (b) said second straight linear elements form a plurality of second parallel channels on said second surface extending between adjacent edges of the separator, one of said adjacent edges between which said first channels extend being a side opposite one of said adjacent edges between which said second channels extend.

12. The separator of claim 8 and additionally comprising:
   (a) a first sheet of porous insulative material disposed over said first surface; and,
   (b) a second sheet of porous insulative material disposed over said second surface, said first and second sheets of insulative material being adapted to form over said first and second straight linear elements, respectively, so as to transfer the compressive forces being applied against the separator by the electrodes over broader lines of contact.

13. The improved separator for an electrochemical cell of claim 12 wherein:

said first and second sheets of porous insulative material include portions which are adapted to deform into said plurality of conduits between said first and second surfaces and contact one another therein to additionally form a capillary path between said first and second surfaces for the containment of liquid electrolyte therein.

14. The separator of claim 12 wherein:

said first and second sheets of insulative material each comprise an outer microporous overlay sheet portion for contacting the adjacent electrode of the cell and an inner capillary-defining porous material adapted to deform into said plurality of conduits between said first and second surfaces to form a capillary path between said first and second surfaces for the containment of liquid electrolyte therein.

* * * * *

UNITED STATES PATENT AND TRADEMARK OFFICE
CERTIFICATE OF CORRECTION

PATENT NO. : 4,664,992
DATED : May 12, 1987
INVENTOR(S) : Dean B. Edwards et al

It is certified that error appears in the above-identified patent and that said Letters Patent are hereby corrected as shown below:

Column 5, lines, 44-45, cancel ."The positive electrode to the negative electrode where it is recombined."

Column 6, line 22, cancel "non-parallelly"

lines 22-23, change "with respect" to --non-parallel--

Column 7, lines 31-32, cancel "non-parallelly"

line 32, change "with respect" to --non-parallel--

Signed and Sealed this

Twenty-second Day of September, 1987

Attest:

DONALD J. QUIGG

Attesting Officer     Commissioner of Patents and Trademarks